(12) United States Patent
Pohl et al.

(10) Patent No.: US 10,602,588 B2
(45) Date of Patent: Mar. 24, 2020

(54) AUTONOMOUS UNDERWATER VEHICLE LIGHT SHOW

(71) Applicant: Intel Corporation, Santa Clara, CA (US)

(72) Inventors: Daniel Pohl, Puchheim (DE); Roman Schick, Krailling (DE)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/361,259

(22) Filed: Mar. 22, 2019

(65) Prior Publication Data

US 2019/0223272 A1    Jul. 18, 2019

(51) Int. Cl.
| | | |
|---|---|---|
| *H05B 37/02* | (2006.01) | |
| *G01S 5/18* | (2006.01) | |
| *B63G 8/00* | (2006.01) | |
| *G01S 1/72* | (2006.01) | |
| *G01S 5/30* | (2006.01) | |

(52) U.S. Cl.
CPC ......... *H05B 37/0227* (2013.01); *B63G 8/001* (2013.01); *G01S 1/72* (2013.01); *G01S 5/183* (2013.01); *G01S 5/30* (2013.01); *B63B 2201/08* (2013.01); *B63G 2008/004* (2013.01)

(58) Field of Classification Search
CPC ...................... B63B 2201/08; H05B 37/0227
See application file for complete search history.

(56) References Cited

U.S. PATENT DOCUMENTS

| | | | |
|---|---|---|---|
| 2011/0026614 A1* | 2/2011 | Allen ..................... | G01S 17/10 375/259 |
| 2019/0277695 A1* | 9/2019 | Gensemer ............. | G01J 3/2823 |

OTHER PUBLICATIONS

Going Viral; "1000 Drones Light Show for Chinese Lantern Festival Set Guinness record"; https://www.youtube.com/watch?v=H5IvXhrmwfA&feature=youtu.be; published on Feb. 14, 2017.
Chadvar Chanev; "Cruise Ship Cost to Build"; https://www.cruisemapper.com/wiki/759-how-much-does-a-cruise-ship-cost, published on Nov. 26, 2015.
Xi Zhang et al.; "Underwater wireless communications and networks: theory and application: Part 1 [Guest Editorial]"; https://ieeexploreieee.org/document/7321969?reload=true, published on Nov. 11, 2015.

(Continued)

*Primary Examiner* — Monica C King
(74) *Attorney, Agent, or Firm* — Viering, Jentschura & Partner mbB

(57) ABSTRACT

A luminous intensity compensator, comprising a light source; a sensor, configured to receive sensor information representing a position of the light source, and to output sensor data representing the position of the light source; one or more processors, configured to determine from the sensor data a distance between the light source and a reference point; determine a loss factor of a wavelength based on the determined distance between the light source and the reference point; determine a compensated luminous intensity to yield a target luminous intensity of the wavelength after luminous intensity reduction due to the loss factor; and output control data to control the light source to emit the wavelength at the compensated luminous intensity.

20 Claims, 9 Drawing Sheets

(56) References Cited

OTHER PUBLICATIONS

Wikipedia; "Underwater acoustic communication"; https://en.wikipedia.org/wiki/Underwater_acoustic_communication; retrieved on Apr. 9, 2019.
Underwater Holdings LLC; "Basic Principles of Light Underwater"; http://www.divephotoguide.com/getting-started-with-underwater-photography/basic-principles-light-underwater/; retrieved on Apr. 9, 2019.
BAE Systems; "Undersea navigation and positioning system development to begin for U.S. Navy"; https://www.baesystems.com/en-us/article/undersea-navigation-and-positioning-system-development-to-begin-for-u-s-navy; published on May 16, 2016.
Kyle Mizokami; "The Navy Is Working on Underwater Wireless Charging Stations for Robot Subs"; https://www.popularmechanics.com/military/research/news/a27986/the-navy-is-developing-undersea-wireless-charging-stations-for-robotic-subs/; published on Aug. 29, 2017.
Logan Mock-Bunting; "The many challenges of underwater communication"; https://schmidtocean.org/cruise-log-post/the-many-challenges-of-underwater-communication; published on Apr. 3, 2015.

* cited by examiner

AUTONOMOUS UNDERWATER VEHICLE LIGHT SHOW

TECHNICAL FIELD

Various embodiments relate generally to autonomous underwater vehicle ("AUV") light shows.

BACKGROUND

It is known to use a plurality of unmanned aerial vehicles ("UAVs") to perform an aerial light show. In such circumstances, the UAVs may be equipped with one or more lights, which the UAVs are programmed to illuminate from predetermined aerial positions. The plurality of UAVs may be programmed to light shows in which the UAVs depict designs, words, or otherwise. Various aspects of aerial light shows are unsuitable for underwater applications.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

Figure 1:
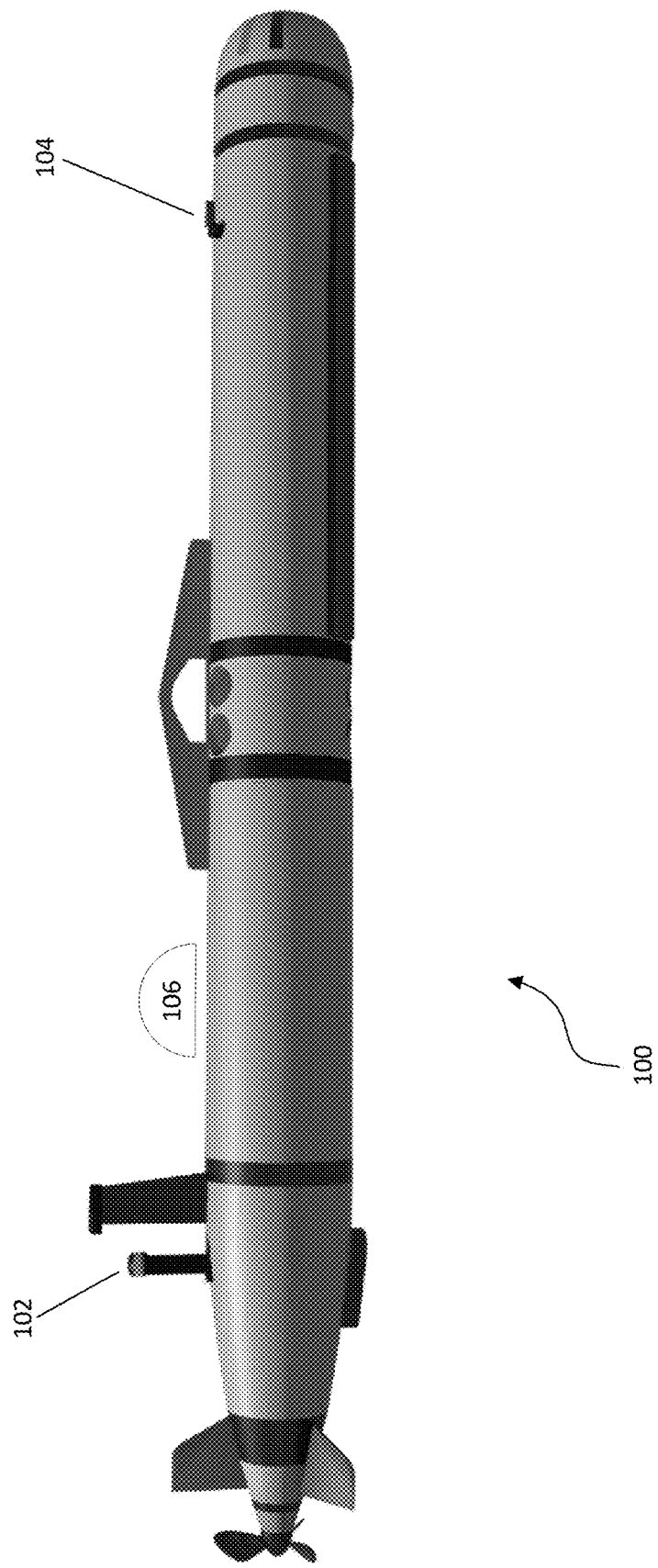
FIG. 1 depicts a configuration of an AUV 100 according to one aspect of the disclosure.

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration." Any embodiment or design described herein as "exemplary" is not necessarily to be construed as preferred or advantageous over other embodiments or designs.

Throughout the drawings, it should be noted that like reference numbers are used to depict the same or similar elements, features, and structures.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "position" used with regard to a "position of an autonomous underwater vehicle", "position of an object", "position of an obstacle", and the like, may be used herein to mean a point or region in a two- or three-dimensional space. It is understood that suitable coordinate systems with respective reference points are used to describe positions, vectors, movements, and the like.

The term "map" used with regard to a two- or three-dimensional map may include any suitable way of describing positions of objects in the two- or three-dimensional space.

According to various aspects, a voxel map may be used to describe objects in the three dimensional space based on voxels associated with objects. To prevent collision based on a voxel map, ray-tracing, ray-casting, rasterization, etc., may be applied to the voxel data.

An autonomous underwater vehicle (UAV) is a watercraft that is capable of autonomous underwater travel. In autonomous travel, a human pilot is not aboard and in control of the autonomous underwater vehicle. The autonomous underwater vehicle may also be denoted as unstaffed, uninhabited or an unpiloted vehicle, -watercraft or -watercraft system or drone.

The autonomous underwater vehicle, according to various aspects, may include a support frame that serves as basis for mounting components of the autonomous underwater vehicle, as for example, motors, sensors, mechanic, transmitter, receiver, and any type of control to control the functions of the autonomous underwater vehicle as desired.

The autonomous underwater vehicle, according to various aspects, may include a camera gimbal having an independent two- or three-axes degree of freedom to properly track a target, e.g. a person or point of interest, with a tracking camera independently of an actual flight direction or actual attitude of the autonomous underwater vehicle. In some aspects, a depth camera may be used for tracking, monitoring the vicinity, providing images to a user of the drone, etc. A depth camera may allow associating depth information with an image, e.g., to provide a depth image. This allows, for example, providing an image of the vicinity of the autonomous underwater vehicle including depth information about one or more objects depicted in the image. As an example, a depth image may include information to indicate a relative distance of objects displayed in the image. This distance information may be, but is not limited to, colors and/or shading to depict a relative distance from a sensor. Based on depth images, a three dimensional map may be constructed from the depth information. Said map construction may be achieved using a depth map engine, which may include one or more processors or a non-transitory computer readable medium configured to create a depth map from the depth information provided by the depth images.

The autonomous underwater vehicle described herein can be in the shape of a torpedo or a copter (e.g. multi rotor copter), i.e. a rotorcraft autonomous underwater vehicle, e.g. a quad-rotor autonomous underwater vehicle, a hex-rotor autonomous underwater vehicle, an octo-rotor autonomous underwater vehicle. The autonomous underwater vehicle described herein may include a plurality of rotors (e.g., three, four, five, six, seven, eight, or more than eight rotors), also referred to as propellers. Each of the propeller has two or more propeller blades. The propellers may be fixed pitch propellers.

Although it is known to perform aerial light shows using one or more unmanned aerial vehicles, underwater light shows present special difficulties. One such difficulty may be the necessity for underwater navigation. The global positioning system, and other similar positioning systems, have become commonplace for above-water applications. These systems provide an acceptably reliable basis with which to determine position, and various techniques are available to increase accuracies of the systems to very high levels. Underwater, however, these positioning systems alone are of diminished value, as the signals upon which they rely typically cannot travel readily through the water.

Certain underwater positioning systems have been developed to resolve this problem. Some such underwater positioning systems rely on audio signals to transmit position information, given the ability of audio signals to travel much greater distances underwater. A variety of standards and applications exist for such audio-based positioning systems. In addition, hybrid systems, combining above-water global positioning system signals with underwater acoustic signals are also known. The principles and methods described herein may be carried out with any form of underwater positioning system, whether acoustic-based, hybrid, or otherwise. Nothing in this description related to a specific type of underwater positioning system should be understood as being limiting.

Another difficulty facing underwater light shows is the absorption of visible electromagnetic wavelengths in water. Even in clear water, electromagnetic frequencies are absorbed. Moreover, the absorption rate of visible electromagnetic waves is dependent on the particular electromagnetic frequency. Thus, different colors are absorbed at different rates underwater, and colors, which may be a mixture of various electromagnetic wavelengths, will be altered in underwater transmission because their various wavelength components will be absorbed at different absorption rates. It is desired to compensate for this problem, such that audience members watching underwater light show may perceive a desired or intended color. This may require adjustment of light wavelength intensity at the source, such that a target color results after absorption due to transmission within water.

FIG. 1 depicts a possible configuration of an AUV 100 according to one aspect of the disclosure. In this configuration, a torpedo-style AUV is utilized, characterized by an elongated cylindrical design with a propulsion device at the rear end. It is expressly noted that this design of the AUV is provided for demonstrative purposes only, and any AUV design that is capable of being equipped with one or more lights may be utilized for the principles and procedures described herein. The AUV may be equipped with a positioning sensor 102, configured to receive one or more position signals. The AUV may be equipped with an image sensor 104, configured to receive an image and to output data representing one or more elements of the image. The UAV may be equipped with one or more light sources 106, configured to emit one or more light wavelengths at a predetermined duration and intensity.

Figure 2:
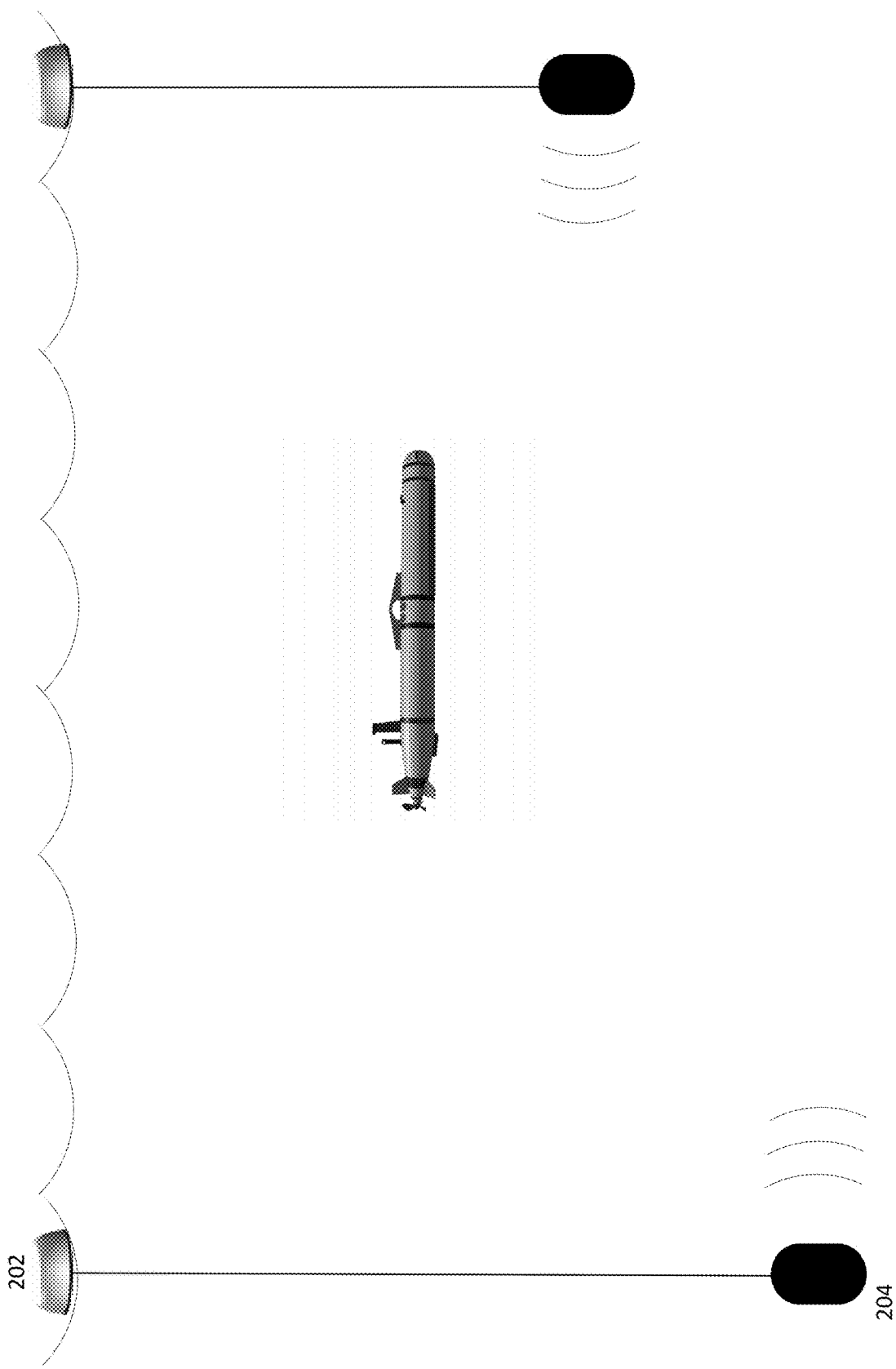
FIG. 2 depicts an AUV operating within an underwater positioning system, according to an aspect of the disclosure.

FIG. 2 depicts an AUV operating within an underwater positioning system, according to an aspect of the disclosure. In order to reach the necessary coordinates for a light show, the AUVs may be equipped with one or more position sensors which are configured to obtain positioning information from an underwater position system. A variety of underwater positions are known, and others are being developed. Many underwater positioning systems rely on transmission of sound waves, which travel more readily underwater than transmission of light waves or radio frequencies. A known method of underwater positioning system is a hybrid system as depicted herein, including an above-water beacon 202 using a conventional positioning system (such as the global positioning system), attached to an underwater audio positioning beacon 204. In this case, the above water beacon 202 is configured to receive positioning information from positioning system such as the Global Positioning System. The received position information is transmitted from the above-water beacon 202 to a below-water beacon 204. The AUV may be configured to receive positioning signals from a plurality of beacons and to triangulate its location based on relative distances from the plurality of beacons. That is, the beacon may transmit its own position, or the AUV may be aware of the beacon's position, and based on an audio signal loss of the transmission, the AUV may determine a relative distance from the specific beacon. By performing this determination with respect to a plurality of beacons, the AUV's position can be determined or triangulated.

Figure 3:
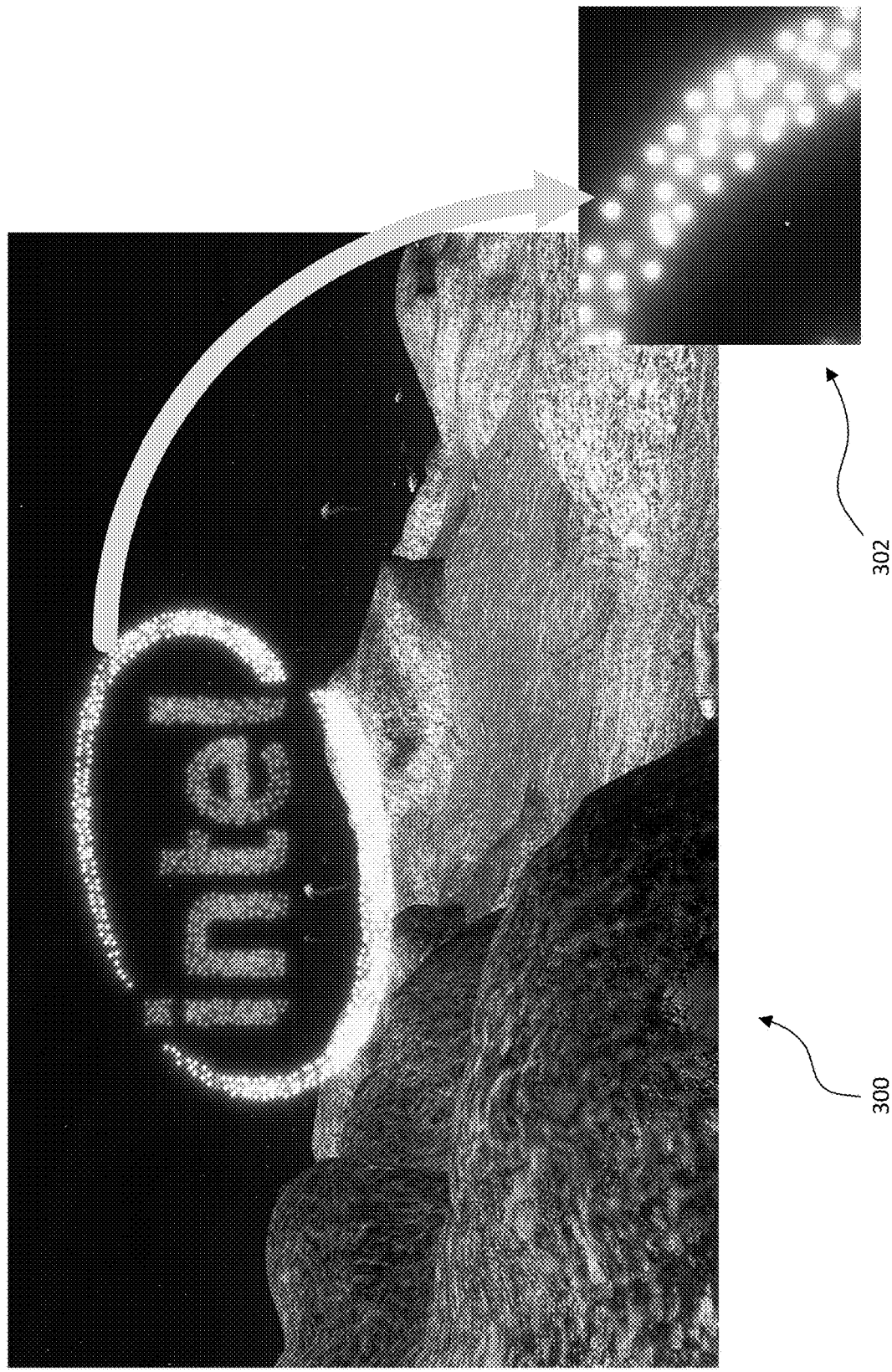
FIG. 3 depicts an underwater AUV light show 300.

FIG. 3 shows a depiction of an underwater AUV light show 300. A plurality of AUVs may be configured to achieve one or more predetermined positions in an underwater environment and to project light from a light source at predetermined times or from predetermined positions to create one or more desired images. In this example, a plurality of AUVs have been preprogrammed to form the word "intel" and to project light from this formation such that the intel logo is visible from above the water surface. A constellation of AUVs clustered together to create an image is depicted in 302, in which a portion of the Intel logo is approximated by a plurality of AUVs. In the context of an underwater light show, the projections may not be limited to a single image, as depicted in FIG. 3, but rather may be a series of images. According to another aspect of the disclosure, the AUVs may be configured to travel such that one image morphs or transitions into a next image. It is expressly noted that the images depicted may be two-dimensional or three-dimensional. For example, said images may be depicted by a plurality of AUVs at one or more lateral locations (including x-axis and/or z-axis) within a water body and/or at one or more depths (y-axis) within a body of water. The one or more AUVs may utilize three dimensions to depict one or more geometric shapes. For example, the AUVs may be utilized to depict, without limitation, any line segments, rays, curves, polygons and/or polyhedrons. Such shapes may include, but are not limited to, squares, triangles, rectangles, cubes, prisms, pyramids, spheres, cones, and cylinders.

Figure 4:
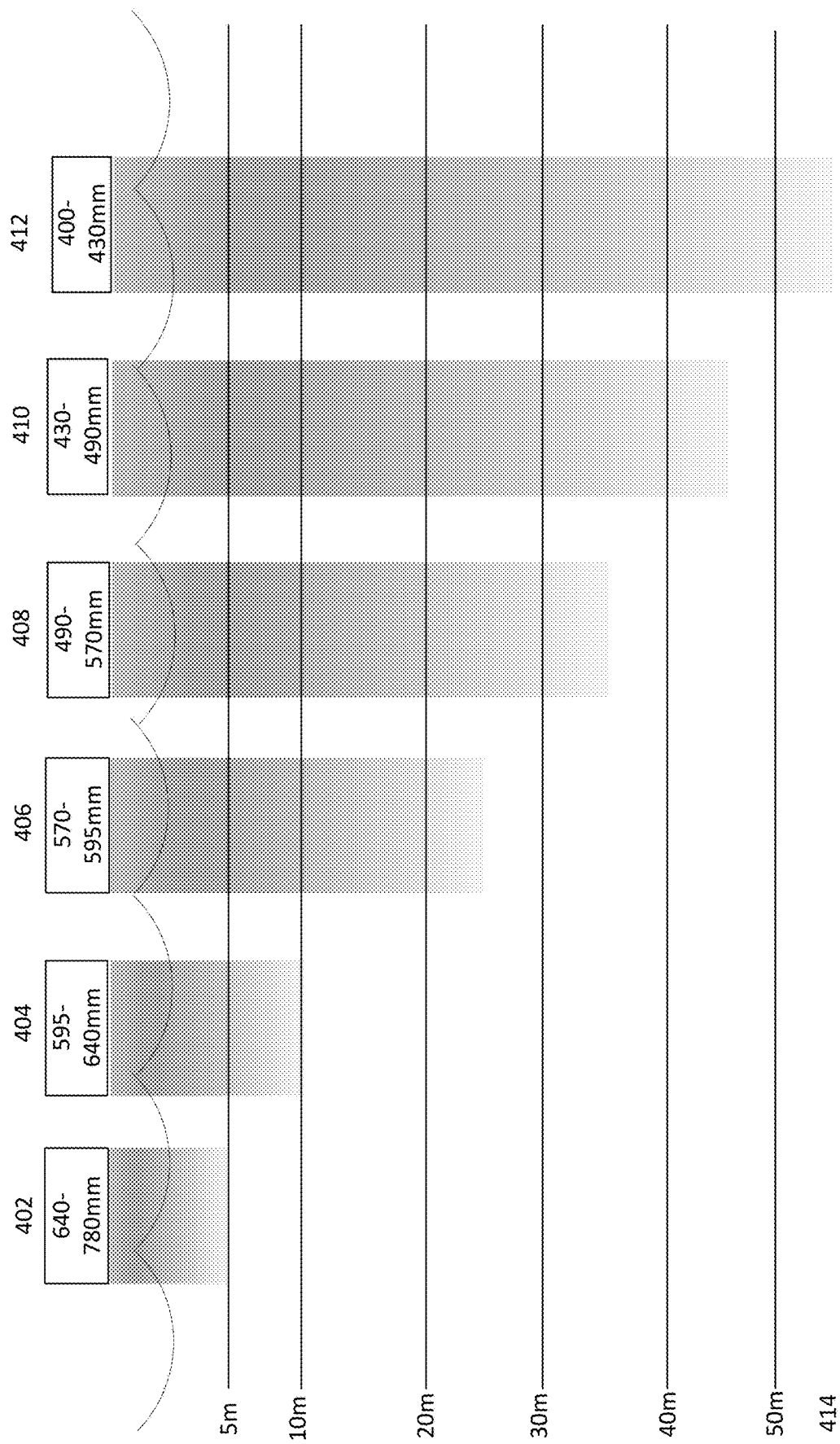
FIG. 4 depicts a plurality of light wavelengths ranging from 400 mm to 780 mm and their relevant absorptions within water.

FIG. 4 depicts a plurality of light wavelengths ranging from 400 mm to 780 mm and their relevant absorptions within water. Along the top of FIG. 4, a substantially red light ranging from 640 to 780 millimeters is depicted by 402. A substantially orange light ranging from 595 to 640 millimeters is depicted by 404. A substantially yellow light ranging from 570 to 595 millimeters is depicted by 406. A substantially green light ranging from 490 to 570 millimeters is depicted by 408. A substantially blue light ranging from 430 to 490 millimeters is depicted by 410. A substantially indigo light ranging from 400 to 430 millimeters is depicted by 412. On the left side of FIG. 4, a scale representing a depth of the water ranging from 1 meter to 50 meters is depicted 414. As shown, the light wavelengths are absorbed at different rates within the water. The substantially red light 402 is largely absorbed at a depth of 5 meters. The substantially orange light 404 is largely absorbed at a depth of 10 meters. The substantially yellow light 406 is largely absorbed at a depth of 25 meters. The substantially green light 408 is largely absorbed at a depth of 35 meters. The substantially blue light 410 is largely absorbed at a depth of 50 meters. The substantially indigo light 412 may extend potentially well beyond a depth of 50 meters.

Figure 5:
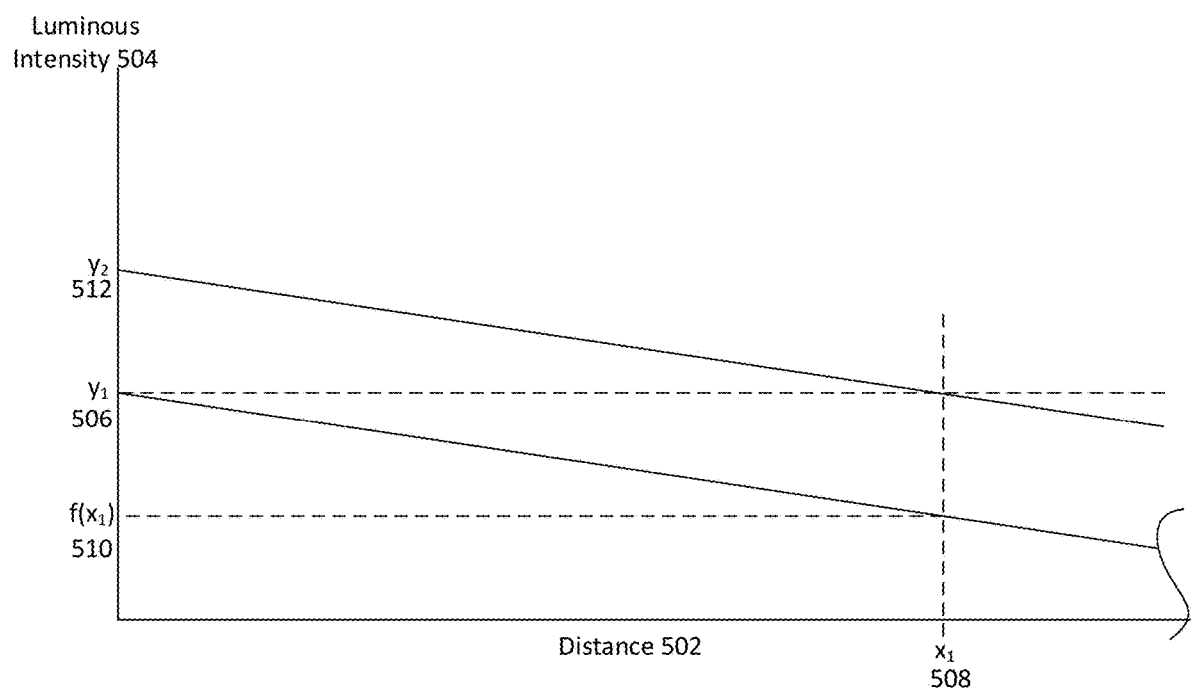
FIG. 5 depicts a luminous intensity adjustment for a target outcome.

FIG. 5 depicts luminous intensity alteration due to distances travelled through water, and compensation thereof. This diagram depicts a distance traveled in water 502 along the x-axis and a luminous intensity 504 along the y-axis. Light from for a particular AUV must travel the distance of $x_1$ 508, during which a portion of the luminous intensity will be absorbed. In this case, it is desired for a spectator above the water to appreciate light at luminous intensity $y_1$ 506. If, hypothetically, the light source were to emit a light wavelength at luminous intensity $y_1$ 506, the resulting luminous intensity after accounting for water absorption would be less than $y_1$, and would thus yield an undesirable result and would not satisfy the stated goal of spectator appreciation of luminous intensity at $y_1$. In this hypothetical situation, the light travels the distance of $x_1$, during which a portion of the luminous intensity is absorbed. Upon travelling the distance to $x_1$ underwater, the original luminous intensity of $y_1$ 506 has been reduced to $f(x_1)$ 510 due to absorption within water. It is expressly noted that the reductions of luminous intensity depicted herein are provided for demonstration only, and that an actual pattern of luminous intensity reduction may appear otherwise. For example, the reduction of luminous intensity in a given body of water may have a slope that is greater or less than depicted herein. Moreover, the reduction of luminous intensity may occur according to a curve rather than a linear reduction. Whatever the reduction of luminous intensity, the methods and procedures described herein may be used to adjust the luminous output such that a target luminous intensity may be reached.

In order to achieve spectator appreciation of light at luminous intensity $y_1$ 506 after traveling distance $x_1$ underwater, it is necessary to increase the original luminous intensity emission, such that the resulting luminous intensity after water absorption is $y_1$. In this case, the light source must emit light at luminous intensity $y_2$ 512, which after traveling a distance of $x_1$ underwater, will have a luminous intensity of $y_1$ 506. Because the absorption rates due to traveling in water are predictable, these calculations may be made in advance, in order to compensate for water absorption based on traveling through predetermined distances of water. As described herein, further adaptations may be made, some even in real time, to compensate for other factors such as water impurities, fresh water versus salt water, or spontaneous changes in water heights due to tides, waves, etc.

Figure 6:
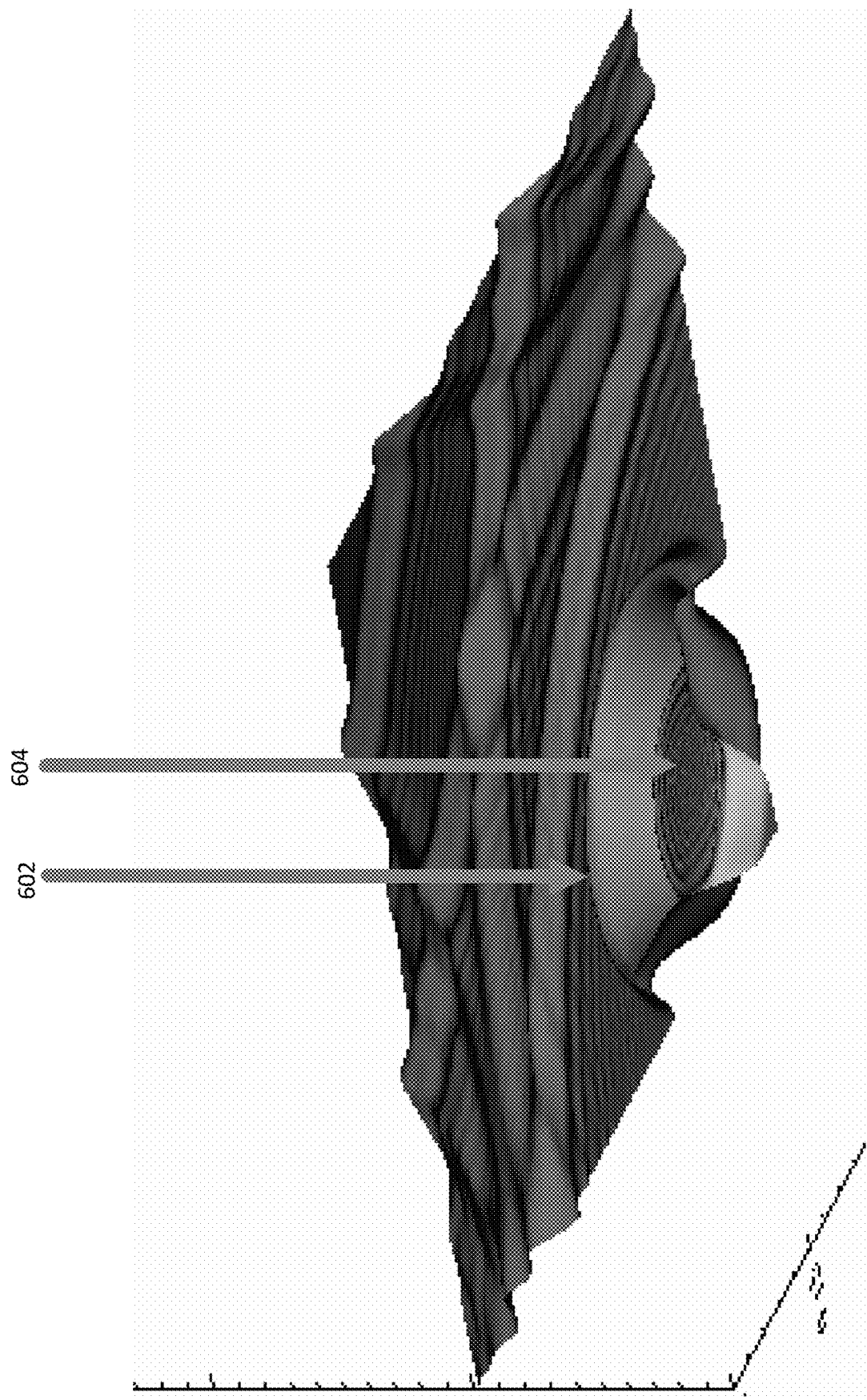
FIG. 6 depicts a luminous intensity adjustment pursuant to a determined wave height.

FIG. 6 depicts a light intensity adjustment pursuant to a determined wave height. Depicted in this figure is a top surface of a body of water in which a light show is to be performed. One or more image sensors may be configured to receive images of the water surface, as depicted herein. According to one aspect of the disclosure, the one or more image sensors may be depth cameras or stereo cameras, which are capable of deriving depth information from one or more received images. According to another aspect of the disclosure, the images received from the one or more image sensors may be analyzed by any known photogrammetry methods to derive depth information. By deriving depth information, one or more waves may be detected, such that the waves correspond to a raised portion of the water surface, and the remainder corresponds to a non-raised or lower portion of the water surface.

In this figure, a raised portion of the water surface corresponding to a wave is detected and depicted as 602. A lower portion of the water surface is detected in depicted as 604. One or more processors may be configured to receive data corresponding to the received image sensor images and to create from said data a map of the water surface. The one or more processors may be configured to create a prediction model, which maps the raised and lowered patterns along the water surface and predicts a future height of the water surface for a reference point. The reference point may correspond to a portion of the water surface through which a spectator may view an underwater AUV light show. By predicting this water height in advance, the one or more AUVs may be instructed to modify a light intensity such that a light intensity perceived by the spectator approximates the target light intensity after reduction for light absorption by the distance of water between the UAV and the reference point, considering the increased height due to a wave.

Figure 7:
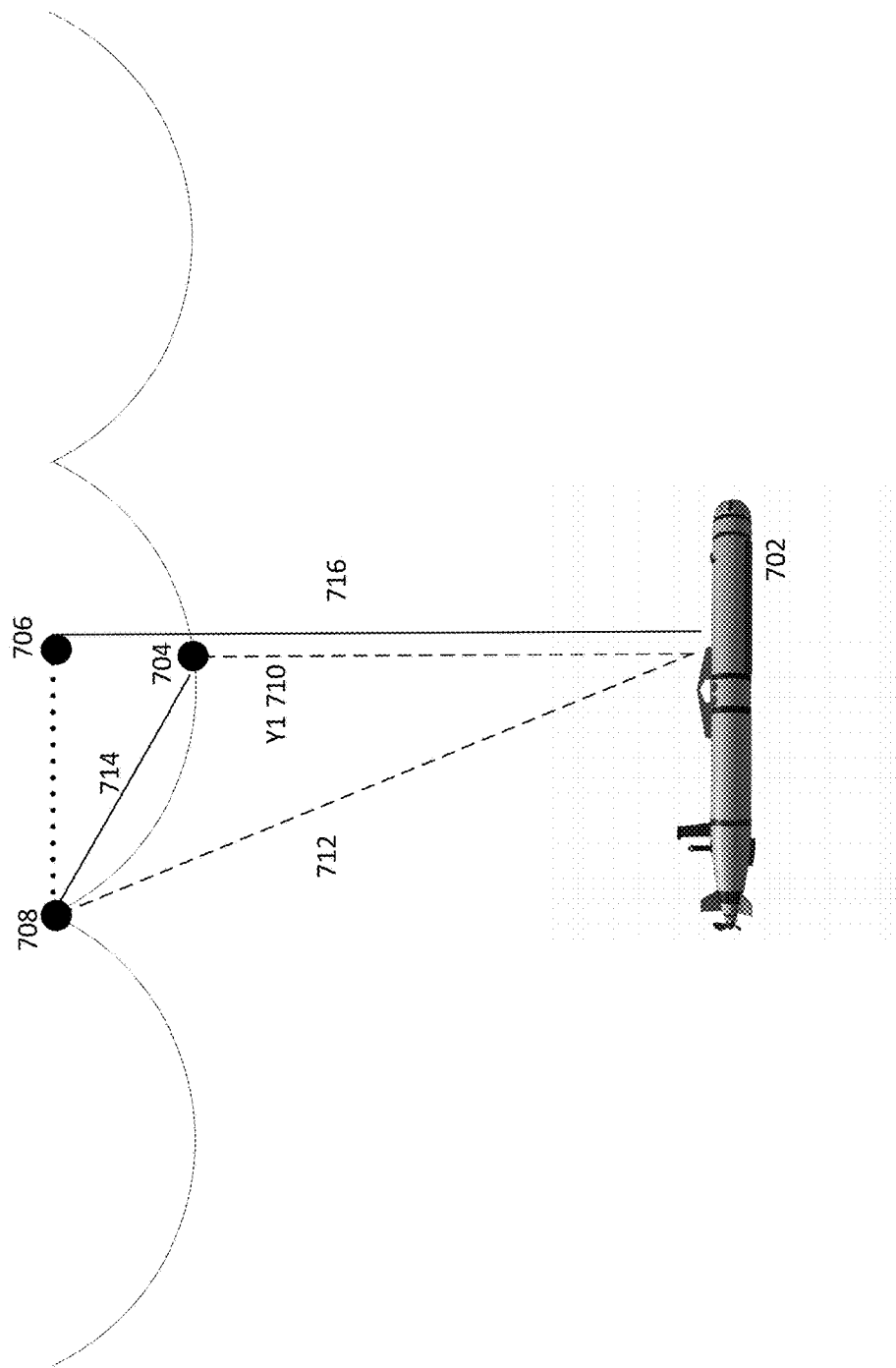
FIG. 7 depicts an additional aspect adjusting the luminous intensity for a predicted water height.

FIG. 7 depicts an additional aspect of adjusting the luminous intensity for a predicted water height. In this case, AUV 702 is depicted as being beneath a water surface depicted as 704. For the sake of this example, it is assumed that a spectator is positioned such that the spectator views the AUV 702 from a vantage point along a z-axis corresponding to the line 710 between the AUV 702 and the reference point 704. One or more image sensors may be configured to obtain images of the water surface and may detect one or more waves or high water points. In this case, a wave or high water point is depicted at the end of the line segment 710 reaching upward from the AUV 702 to reference point 708. A distance between reference point 708 and reference point 704 as indicated by line segment 714 may then be calculated. This calculation may be performed by one or more processors viewing above-water image data including reference point 708 and reference point 704, or the calculation may be performed by one or more processors receiving underwater image data including reference point 708 and reference point 704. In the event that underwater image data is used, the calculation may be performed by calculating the distance between the AUV 702 and reference point 708, and a distance between the AUV 702 and the reference point 704. Using this information and simple geometric calculations, the distance between the AUV 702 and a water surface at 706 in the future, directly above the AUV 700 into the height of reference point 708 can be calculated.

Figure 8:
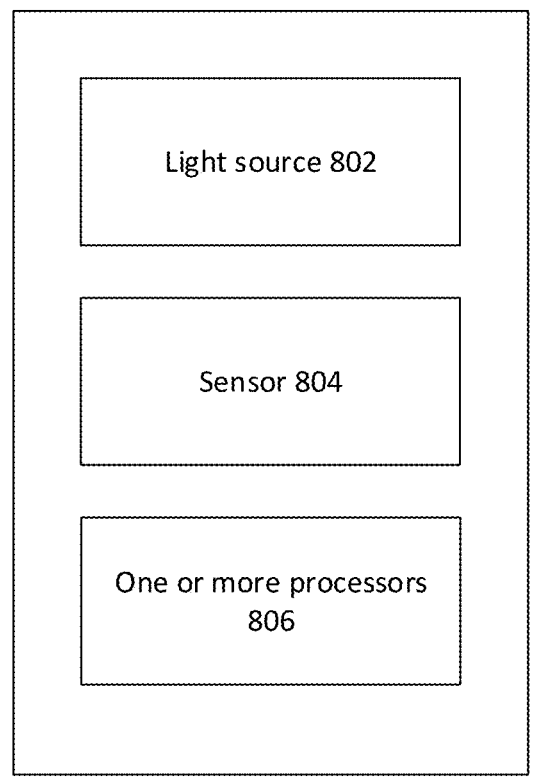
FIG. 8 depicts a luminous intensity compensator.

FIG. 8 depicts a luminous intensity compensator 800, including a light source 802; a sensor 804, configured to receive sensor information representing a position of the light source, and to output sensor data representing the position of the light source; and one or more processors 806, configured to: determine from the sensor data a distance between the light source and a reference point; determine a loss factor of a wavelength based on the determined distance between the light source and the reference point; determine a compensated luminous intensity to yield a target luminous intensity of the wavelength after luminous intensity reduction due to the loss factor; output control data to control the light source to emit the wavelength at the compensated luminous intensity relative to the reference point.

Figure 9:
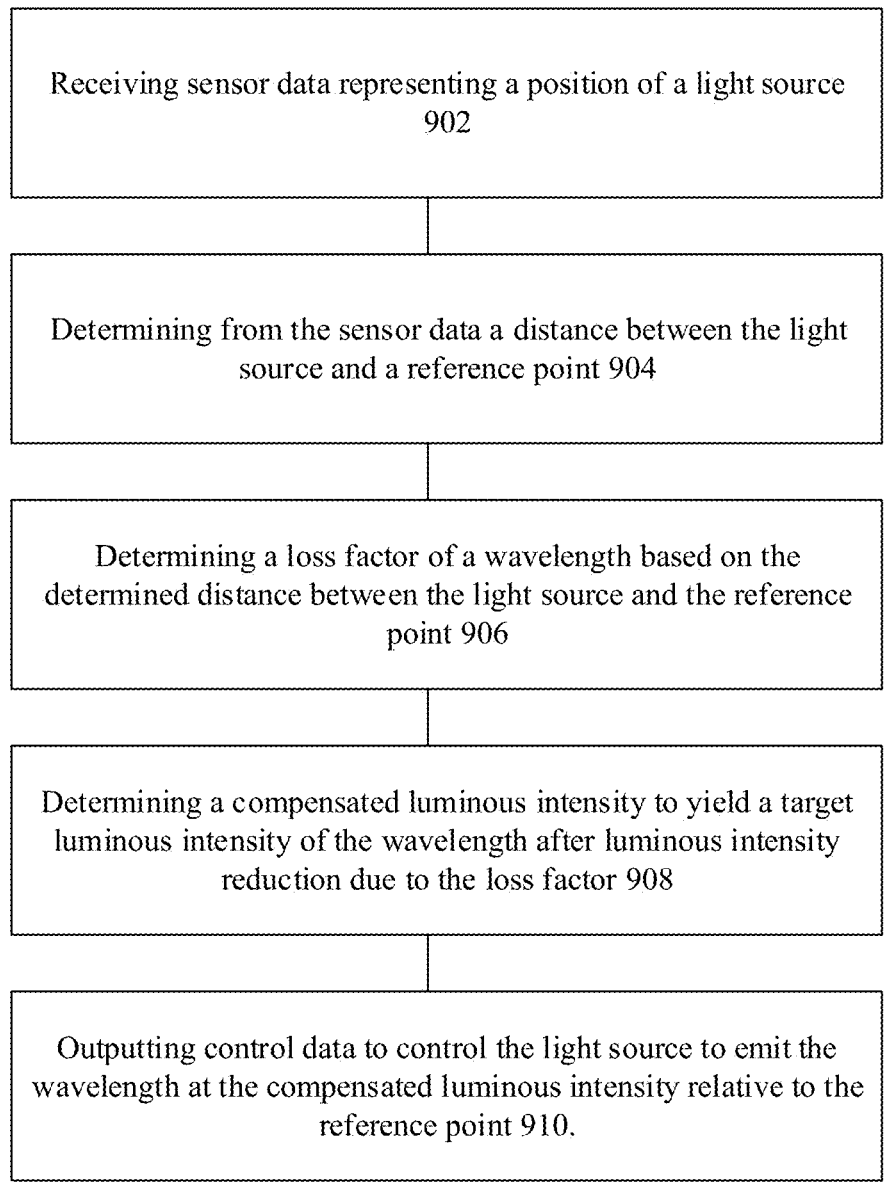
FIG. 9 depicts a method of luminous intensity compensation.

FIG. 9 depicts a method of luminous intensity compensation 900 including receiving sensor data representing a position of a light source 902; determining from the sensor data a distance between the light source and a reference point 904; determining a loss factor of a wavelength based on the determined distance between the light source and the reference point 906; determining a compensated luminous intensity to yield a target luminous intensity of the wavelength after luminous intensity reduction due to the loss factor 908; and outputting control data to control the light source to emit the wavelength at the compensated luminous intensity relative to the reference point 910.

AUV light shows may be used for any event or purpose for which an audience would be able to view one or more AUVs beneath a water surface. A non-limiting example of such an occasion includes AUV light shows for cruise ships. Such shows could be visible from a deck of the ship, as well as from any underwater portions, such as windows or portholes beneath the water's surface, or even from areas with one or more transparent walls or floors. Another venue for an underwater AUV light show includes an amusement park, which may already offer sufficient water resources, such as pools or lakes, and may have a readily-available audience seeking entertainment opportunities.

The type of AUV is quite flexible and could include an AUV that is designed specifically for an underwater light show, or simply a stock or commercial AUV that is equipped to perform an underwater light show. Such equipment for performing an underwater light show may include, but is not limited to, a means of communication or sensing and at least one lamp. The AUV may have any number of lamps, which may be capable of producing one or more simultaneous or concurrent light projections at one or more different wavelengths. According to one aspect of the disclosure, the one or more lamps may be configured to emit light in an upward direction. Such light emission may permit increased visibility for spectators on land or on a water surface.

The AUVs may be programmed in advance to carry out a predetermined path of travel. That is, prior to beginning the underwater light show, one or more AUVs may be preprogrammed with data representing a variety of coordinates from which light may be displayed. The preprogramming may further include instructions representing timing of lighting, color of lighting, and/or intensity of lighting. The lighting instructions may correspond to one or more predetermined locations or instructions. The predetermined flight plan may be transmitted to the AUV prior to beginning the light show, or may be transmitted, whether in whole or in part, during a portion of the light show. That is, the one or more AUVs may be configured to accept a wireless transmission underwater, according to any such system which permits such transmissions to occur.

The one or more AUVs may use any positioning system capable of providing position information to an underwater vehicle. Although positioning system technology, such as with the global positioning system, is ubiquitous in above-water applications, there are several limitations regarding the use of positioning systems underwater. Principally, the signals utilized in the global positioning system travel such short distances underwater that they are largely unusable for underwater purposes without other system modifications. Several alternative systems for positioning underwater have become available. Many such systems rely on audio-based communication, thereby transferring position data as audio signals. Such systems may utilize a plurality of underwater audio beacons, which are placed at a known location. Each beacon may emit an audio signal that can be tied to the specific beacon. Underwater sound propagation may be influenced by a variety of factors including, but not limited to, frequency, depth, salt content etc. Nevertheless, given a known frequency, and underwater sound propagation system may be calibrated to determine underwater distances based on received audio signals with reasonable accuracy. In the event that at least three known beacons are transmitting, the received audio signals may be triangulated to provide position information to the AUV. That is, the AUV may be capable of navigating to a preprogrammed position for performance of a light show based on information received from the underwater sound propagation system or navigation system. It is specifically noted that a variety of different underwater positioning systems are available and are being developed, and the methods and techniques described herein may be implemented with any such system, provided that position information of an AUV is determinable from the underwater positioning system.

Water being approximately eight hundred times denser than air, light from underwater light sources may be wholly or partially absorbed before reaching a water surface. The rate of light absorption is largely dependent on the light wavelength, such that certain colors, such as red, are absorbed very rapidly within water, while other colors, such as blue, are less readily absorbed. The AUVs may counteract said absorption rates by employing a strategy to cause one or more light sources to omit wavelengths at increased luminous intensities to achieve a desired perceived or target luminous intensity following luminous absorption underwater.

The absorption of colors underwater is wavelength-specific. As a rule, longer light wavelengths are absorbed more readily in water, and shorter light wavelengths are absorbed less readily in water. For example, as one moves deeper into a body of water, longer wavelengths (e.g. red and orange) from the sun, which must travel underwater at least a distance corresponding to the depth, become less prominent and eventually nonexistent, leaving only shorter wavelengths (e.g. blue and indigo). That is, luminous intensity underwater results from at least an interplay of light wavelength (ß) and distance traveled underwater d(x). The following table indicates a general absorption rate of colors based on wavelength. It is specifically noted that the categories of colors expressed in the table and corresponding wavelengths are approximate, as variations in the wavelengths that correspond to a specific color differ within the scientific literature. Moreover, it is noted that the following depths/distances are approximations at which a significant portion of the given wavelength may be absorbed; however, this table is not intended to suggest that no light of the given wavelength exists beyond the distances provided, but rather that much of the light is absorbed.

| Color  | Wavelength | Distance       |
|--------|------------|----------------|
| Violet | 400-430 nm | More than 50 m |
| Blue   | 430-490 nm | 50 m           |
| Green  | 490-570 nm | 35 m           |
| Yellow | 570-595 nm | 25 m           |
| Orange | 595-640 nm | 10 m           |
| Red    | 640-780 nm | 5 m            |

Given the above absorption rates, it is desirable in an underwater light show environment to determine a distance that a given light or wavelength must travel underwater, and from that distance to calculate an absorption of luminous intensity. The 3D distance vector from the AUV to the observer can be calculated in advance, e.g. from the AUV's underwater position to the position of the audience. Based on these factors, the distance that the light travels underwater can be calculated. Using this distance and the wavelength to be projected, a calculation of the water's absorption of the wavelength can be determined. Using this calculation, the initial luminous intensity of the wavelength may be adjusted to yield a target or desired luminous intensity for appreciation by the spectator, the target or desired luminous intensity being calculated to compensate for water absorption of the wavelength. For example, for a red light four meters underwater, it may be desirable to increase the luminous intensity of the red light by a factor of three. Similarly, since a blue light remains comparatively visible underwater at a distance of less than twenty meters, it may be desirable to decrease its intensity by two, to even out the brightness with other colors used in the underwater light show.

One set of equations for calculating luminous intensity absorption as a function of wavelength and distance traveled underwater is as follows:

$$t^R(x) = e^{-\beta^R d(x)} \tag{1}$$

$$t^G(x) = e^{-\beta^G d(x)} = (e^{-\beta^R d(x)})^{\frac{\beta^G}{\beta^R}} = (t^R(x))^{\lambda^G} \tag{2}$$

$$t^B(x) = e^{-\beta^B d(x)} = (e^{-\beta^R d(x)})^{\frac{\beta^B}{\beta^R}} = (t^R(x))^{\lambda^B} \tag{3}$$

wherein x corresponds to a distance traveled underwater, and β corresponds to a wavelength. In these examples, R corresponds to red, G to green, and B to blue.

The methods and principles described herein for adjusting a luminous intensity may be applied to multiple luminous intensities. For example, in the event that it is desired for a spectator to appreciate white light in an underwater light show, it may be decided for one or more light sources to emit red, green, and blue light, such that a white light is formed. However, because these colors will be absorbed differently by the water through which the light travels, the resulting light after accounting for water absorption will not be perceived as white light. For example, and depending on the depth, the red light may be substantially absorbed, while comparatively little of the blue light may be absorbed. To compensate, the one or more light sources can be configured to adjust the lights such that the luminous intensity of the red light is substantially greater and/or the luminous intensity of the blue light is substantially less than would otherwise be necessary to achieve white light given the luminous intensities of the other color(s).

In addition to the equations disclosed above, which may be used to form a mathematical model of the necessary luminous intensities to achieve a target luminous intensity, other factors beyond distance and wavelength may be taken into account in determining a target luminous intensity. For example, it may be desirable to take into account impurities within the water. Water may be of varying quality and transparency. Water may contain minerals, including but not limited to salt, which may affect the transmission of light underwater. These factors may be taken into account when selecting a luminous intensity for a given wavelength. This process may be known as color calibration.

According to one aspect of the disclosure, color calibration may be performed by utilizing one or more image sensors placed at a position to observe the underwater light show. The one or more image sensors may be placed from the position of a spectator or any place from which a target luminous intensity value should be perceived. The one or more image sensors may be configured to obtain images of the light show, and the image data may be analyzed to determine perceived luminous intensities of one or more light wavelengths. These perceived luminous intensities may be compared with target luminous intensities, and any adjustments may be made to the AUV instructions for illuminating their light sources. Assuming that luminous intensity adjustment has already occurred to compensate for absorption within pure water of a given wavelength at a given distance, a deviation between a target luminous intensity and a recorded luminous intensity from the one or more image sensors may be due to water impurities. Accordingly, it may be necessary to perform additional luminous intensity adjustments beyond adjusting only for wavelengths and distance traveled within the water. Such adjustments may be performed in advance of an AUV light show. Alternatively or additionally, such adjustments may be performed contemporaneously with the light show, assuming that an underwater communication system is in place to permit revised instructions to be transmitted to the one or more AUVs.

Another method of performing color calibration is based on measurements from one AUV to another. As a general assumption, there is a strong likelihood that multiple AUVs in a given light show will be within the same body of water, and therefore each of these AUVs is expected to be affected by water impurities in much the same way. Moreover, the impurity concentration should generally be the same within all directions of an AUV, whether toward the surface, toward the bottom, or laterally. As such, if it is desired, for example, to measure light absorption based on an upward transmission of light across a 10 m distance from the AUV to the water's surface, appropriate corrections may be made by measuring transmission values during a lateral transmission of 10 meters from one AUV to another. Accordingly, one or more AUVs may be equipped with a camera system that captures underwater the incoming light and provides feedback to the other AUVs to adjust their lamps to match the expected colors based on the relevant measurements. That is, an anticipated wavelength absorption at a predetermined distance (e.g. 10 meters) can be determined using the formulas provided herein, and the result may be compared to a measurement of luminous intensity from a 10 m distance. A difference between these values may be attributable to water impurities, and this difference may be extrapolated to a distance between the AUV and a reference point, such as a point of the water surface.

According to another aspect of the disclosure, the luminous intensity of the wavelength may be alternatively or additionally be altered based on a measurement of an alteration in water height, such as by a wave. One or more image sensors may be configured to measure waves. Such image sensors may be mounted on one or more AUVs or may be placed in an observational position from above the water surface. In the latter configuration, wherein the one or more image sensors receive images of the water surface from above the water surface, a large aerial view of the water surface may be obtained and analyzed for depth information, such that the presence of waves may be determined; the height of said waves may be determined; and a movement of said waves may be determined. By using multiple cameras looking at the water surface, a 3D reconstruction algorithm may be implemented to determine a 3D mesh of the current wave pattern.

Using this information, it may be determined when a wave travels such that it will come between a UAV and a spectator. The significance of a wave in this position is at least that the wave will cause a light wavelength to travel a greater distance than would otherwise be traveled were the wave not present. If the additional height of the wave can be determined, the additional distance that the wavelength must travel through the water may also be determined, and the luminous intensity may be adjusted to accommodate for the additional absorption encountered due to the additional distance through the water. That is, the position of the observer and a specific AUV can be used to calculate an updated distance vector of the light traveling underwater. This data can be used to modulate the luminous intensity of one or more wavelengths emanating from the AUV. For example, if a wave is one meter high, the intensity of a red light may be increased by 1.5× for the period that the wave is between the AUV and a relevant vantage point.

The AUVs may be preprogrammed to autonomously perform the light show, such that one or more AUVs receive instructions to travel to one or more positions from which the project light at one or more predetermined luminous intensities and wavelengths. The light projections may be constant, intermittent, or otherwise. The positions may be absolute positions, positions relative to one or more other AUVs or objects, or otherwise.

The AUVs may be configured to obtain instructions for the light show in real time. The one or more AUVs may be equipped with one or more sensors, such as a receiver, which permits reception of a signal representing an instruction. In this way, coordinates for a light show and/or instructions for light wavelength, luminous intensity, or light timing or duration may be transmitted to one or more AUVs during a light show.

According to one aspect of the disclosure, the one or more AUVs may be preprogrammed with target luminous intensities to compensate for distances of the electromagnetic wavelengths travelling within water. In this configuration, the adjustments to the luminous intensities to reach a target luminous intensity may be determined by one or more processors physically separate from the one or more AUVs. This may be carried out, for example, at a base station, in a server or otherwise. Said determinations may be made prior to a light show or during a light show.

Determining a target luminous intensity as described herein may include calculating a luminous intensity using one or more of the wavelength absorption formulas includes herein or any other formula for determining an absorption of electromagnetic energy during transmission in water. This may be calculated as a function of wavelength and/or as a function of distance.

Determining a target luminous intensity may be performed by utilizing a look-up table or any other reference to provide an absorption of electromagnetic energy travelling in water as a function of wavelength and/or distance.

According to another aspect of the disclosure, the one or more AUVs may determine the target luminous intensities locally, that is, within their own processors.

According to another aspect of the disclosure, the one or more AUVs may be configured with one or more tanks a pressurized gas and a controllable valve to permit gas escape at predetermined timings or intervals. That is, during an underwater light show, one or more AUVs may be configured to open a valve corresponding to its pressurized gas tank, thereby allowing gas bubbles to escape from the tank underwater. These gas bubbles will float toward the surface of the water, providing a special effect in the course of the underwater light show. The presence of bubbles permits an additional underwater entertainment modality beyond reliance on the configuration of lights.

Beyond the use of lights such as LEDs, the one or more AUVs may be configured with one or more lasers, which may be utilized to create additional lighting effects such as visual laser beams, line-based designs, and/or geometric meshes. According to this configuration, the one or more lasers may be adjustably connected to the AUVs, such that a direction of light emission from the lasers may be controlled, and the lasers may be fired in a predetermined direction and at predetermined durations and timings. The one or more AUVs may be configured such that a laser from a first AUV is emitted in a direction of a second AUV, such that the laser from the first AUV strikes the second AUV, thereby creating a visible line segment between the first AUV and the second AUV.

According to another aspect of the disclosure, the one or more AUVs may be configured with a pump, which may be configured to emit water under pressure from the AUV. This may be used, for example, by directing the AUV toward a surface of the water and initiating the pump such that water is forced under pressure toward and beyond the water's surface. This may be employed to create a fountain effect, whereby a stream of water extends above the water surface. This may be achieved at a predetermined time, from a predetermined location, at predetermined intervals, and at predetermined pressure or pressures.

According to another aspect of the disclosure, the one or more AUVs may be configured to carry out an underwater light show simultaneously or concurrently with any aerial light show.

In the following, various examples are provided with reference to the aspects described above.

In Example 1, a luminous intensity compensator is disclosed, including: a light source; a sensor, configured to receive sensor information representing a position of the light source, and to output sensor data representing the position of the light source; one or more processors, configured to: determine from the sensor data a distance between the light source and a reference point; determine a loss factor of a wavelength based on the determined distance between the light source and the reference point; determine a compensated luminous intensity to yield a target luminous intensity of the wavelength after luminous intensity reduction due to the loss factor; output control data to control the light source to emit the wavelength at the compensated luminous intensity relative to the reference point.

In Example 2, the luminous intensity compensator of Example 1 is disclosed, wherein a distance between the light source and the reference point includes an underwater segment.

In Example 3, the luminous intensity compensator of Example 1 is disclosed, wherein the determined distance is a distance that the wavelength travels through a liquid between the light source and the reference point.

In Example 4, the luminous intensity compensator of any one of Examples 1 to 3 is disclosed, wherein the light source is configured to produce light in a plurality of wavelengths.

In Example 5, the luminous intensity compensator of any one of Examples 1 to 4 is disclosed, wherein the light source is configured to produce light according to any of a plurality of luminous intensities.

In Example 6, the luminous intensity compensator of any one of Examples 1 to 5 is disclosed, wherein the light source includes an LED.

In Example 7, the luminous intensity compensator of any one of Examples 1 to 6 is disclosed, wherein the sensor is an underwater positioning sensor.

In Example 8, the luminous intensity compensator of Example 7 is disclosed, wherein the underwater positioning sensor is configured to operate according to an underwater positioning system.

In Example 9, the luminous intensity compensator of Example 7 or 8 is disclosed, wherein the underwater positioning sensor is configured to operate according to an underwater acoustic positioning system.

In Example 10, the luminous intensity compensator of any one of Examples 7 to 9 is disclosed, wherein the underwater positioning sensor is configured to operate according to a Precision ocean Interrogation, Navigation, and timing (POINT) positioning system.

In Example 11, the luminous intensity compensator of any one of Examples 7 to 9 is disclosed, wherein the underwater positioning sensor is configured to operate according to a POSYDON positioning system.

In Example 12, the luminous intensity compensator of any one of Examples 1 to 11 is disclosed, wherein the reference point is a point at a water surface.

In Example 13, the luminous intensity compensator of any one of Examples 1 to 12 is disclosed, wherein determining from the sensor data the distance between the light source and the reference point includes determining a position of the light source based on the sensor data.

In Example 14, the luminous intensity compensator of any one of Examples 1 to 13 is disclosed, wherein determining from the sensor data the distance between the light source and the reference point includes determining a depth of the light source based on the sensor data and determining a distance between the light source and the reference point based on the determined depth.

In Example 15, the luminous intensity compensator of any one of Examples 1 to 14 is disclosed, wherein the determined distance represents a distance that the wavelength travels through a liquid.

In Example 16, the luminous intensity compensator of any one of Examples 1 to 15 is disclosed, wherein the one or more processors are a system on chip (SOC).

In Example 17, the luminous intensity compensator of any one of Examples 1 to 16 is disclosed, wherein the one or more processors include a light source controller.

In Example 18, the luminous intensity compensator of any one of Examples 1 to 17 is disclosed, wherein the one or more processors are configured to determine the loss factor via a look-up table.

In Example 19, the luminous intensity compensator of any one of Examples 1 to 18 is disclosed, further including a light sensor, configured to detect a light transmission and to output sensor data representing the detected light transmission, and wherein the one or more processors are further configured to determine the loss factor by comparing the output sensor data representing the detected light transmission to a reference value.

In Example 20, the luminous intensity compensator of any one of Examples 1 to 19 is disclosed, wherein the light transmission is a light transmission at a predetermined luminous intensity.

In Example 21, the luminous intensity compensator of any one of Examples 1 to 20 is disclosed, wherein the reference value is a value corresponding to a sensor data value corresponding to a light transmission at the predetermined luminous intensity from a predetermined distance.

In Example 22, the luminous intensity compensator of any one of Examples 1 to 21 is disclosed, wherein at least a segment of the distance between the light sensor and the light transmissions is under water.

In Example 23, the luminous intensity compensator of any one of Examples 1 to 18 is disclosed, further including a sensor, configured to obtain sensor information representing a magnitude of water impurity and to output sensor data representing the magnitude of water of impurity.

In Example 24, the luminous intensity compensator of Example 23 is disclosed, wherein the one or more processors are further configured to determine the loss factor of the wavelength based additionally on the sensor data representing the magnitude of water impurity.

In Example 25, the luminous intensity compensator of any one of Examples 1 to 22 is disclosed, wherein the one or more processors are configured to determine the compensated luminous intensity based on the wavelength and the distance.

In Example 26, the luminous intensity compensator of any one of Examples 1 to 23 is disclosed, wherein the one or more processors are configured to determine the compensated luminous intensity using a look-up table.

In Example 27, one or more processors is disclosed, configured to:
determine from sensor data a distance between a light source and a reference point; determine a loss factor of a wavelength based on the determined distance between the light source and the reference point; determine a compensated luminous intensity to yield a target luminous intensity of a wavelength after luminous intensity reduction due to the loss factor; output control data to control the light source to emit the wavelength at the compensated luminous intensity relative to the reference point.

In Example 28, the one or more processors of Example 27 is disclosed, wherein a distance between the light source and the reference point includes an underwater segment.

In Example 29, the one or more processors of Example 27 is disclosed, wherein the determined distance is a distance that the wavelength travels through a liquid between the light source and the reference point.

In Example 30, the one or more processors of any one of Examples 27 to 29 is disclosed, wherein the light source is configured to produce light in a plurality of wavelengths.

In Example 31, the one or more processors of any one of Examples 27 to 30 is disclosed, wherein the light source is configured to produce light according to any of a plurality of luminous intensities.

In Example 32, the one or more processors of any one of Examples 27 to 31 is disclosed, wherein the light source includes an LED.

In Example 33, the one or more processors of any one of Examples 27 to 32 is disclosed, wherein the sensor is an underwater positioning sensor.

In Example 34, the one or more processors of Example 33 is disclosed, wherein the underwater positioning sensor is configured to operate according to an underwater positioning system.

In Example 35, the one or more processors of Example 33 or 34 is disclosed, wherein the underwater positioning sensor is configured to operate according to an underwater acoustic positioning system.

In Example 36, the one or more processors of any one of Examples 33 to 35 is disclosed, wherein the underwater positioning sensor is configured to operate according to a Precision ocean Interrogation, Navigation, and timing (POINT) positioning system.

In Example 37, the one or more processors of any one of Examples 33 to 35 is disclosed, wherein the underwater positioning sensor is configured to operate according to a POSYDON positioning system.

In Example 38, the one or more processors of any one of Examples 27 to 37 is disclosed, wherein the reference point is a point at a water surface.

In Example 39, the one or more processors of any one of Examples 27 to 38 is disclosed, wherein determining from the sensor data the distance between the light source and the reference point includes determining a position of the light source based on the sensor data.

In Example 40, the one or more processors of any one of Examples 27 to 39 is disclosed, wherein determining from the sensor data the distance between the light source and the reference point includes determining a depth of the light source based on the sensor data and determining a distance between the light source and the reference point based on the determined depth.

In Example 41, the one or more processors of any one of Examples 27 to 40 is disclosed, wherein the determined distance represents a distance that the wavelength travels through a liquid.

In Example 42, the one or more processors of any one of Examples 27 to 41 is disclosed, wherein the one or more processors are a system on chip (SOC).

In Example 43, the one or more processors of any one of Examples 27 to 42 is disclosed, wherein the one or more processors include a light source controller.

In Example 44, the one or more processors of any one of Examples 27 to 43 is disclosed, wherein the one or more processors are configured to determine the loss factor via a look-up table.

In Example 45, the one or more processors of any one of Examples 27 to 44 is disclosed, further including a light sensor, configured to detect a light transmission and to output sensor data representing the detected light transmission, and wherein the one or more processors are further configured to determine the loss factor by comparing the output sensor data representing the detected light transmission to a reference value.

In Example 46, the one or more processors of any one of Examples 27 to 45 is disclosed, wherein the light transmission is a light transmission at a predetermined luminous intensity.

In Example 47, the one or more processors of any one of Examples 27 to 46 is disclosed, wherein the reference value is a value corresponding to a sensor data value corresponding to a light transmission at the predetermined luminous intensity from a predetermined distance.

In Example 48, the one or more processors of any one of Examples 27 to 47 is disclosed, wherein at least a segment of the distance between the light sensor and the light transmissions is under water.

In Example 49, the one or more processors of any one of Examples 27 to 48 is disclosed, further including a sensor, configured to obtain sensor information representing a magnitude of water impurity and to output sensor data representing the magnitude of water of impurity.

In Example 50, the one or more processors of Example 49 is disclosed, wherein the one or more processors are further configured to determine the loss factor of the wavelength based additionally on the sensor data representing the magnitude of water impurity.

In Example 51, the one or more processors of any one of Examples 27 to 50 is disclosed, wherein the one or more processors are configured to determine the compensated luminous intensity based on the wavelength and the distance.

In Example 52, the one or more processors of any one of Examples 27 to 51 is disclosed, wherein the one or more processors are configured to determine the compensated luminous intensity using a look-up table.

In Example 53, an autonomous underwater vehicle is disclosed, including: a light source; a sensor, configured to receive sensor information representing a position of the light source, and to output sensor data representing the position of the light source; one or more processors, configured to: determine from the sensor data a distance between the light source and a reference point; determine a loss factor of a wavelength based on the determined distance between the light source and the reference point; determine a compensated luminous intensity to yield a target luminous intensity of the wavelength after luminous intensity reduction due to the loss factor; output control data to control the light source to emit the wavelength at the compensated luminous intensity relative to the reference point.

In Example 54, the autonomous underwater vehicle of Example 53 is disclosed, wherein a distance between the light source and the reference point includes an underwater segment.

In Example 55, the autonomous underwater vehicle of Example 53 is disclosed, wherein the determined distance is a distance that the wavelength travels through a liquid between the light source and the reference point.

In Example 56, the autonomous underwater vehicle of any one of Examples 53 to 55 is disclosed, wherein the light source is configured to produce light in a plurality of wavelengths.

In Example 57, the autonomous underwater vehicle of any one of Examples 53 to 56 is disclosed, wherein the light source is configured to produce light according to any of a plurality of luminous intensities.

In Example 58, the autonomous underwater vehicle of any one of Examples 53 to 57 is disclosed, wherein the light source includes an LED.

In Example 59, the autonomous underwater vehicle of any one of Examples 53 to 58 is disclosed, wherein the sensor is an underwater positioning sensor.

In Example 60, the autonomous underwater vehicle of Example 59 is disclosed, wherein the underwater positioning sensor is configured to operate according to an underwater positioning system.

In Example 61, the autonomous underwater vehicle of Example 59 or 60 is disclosed, wherein the underwater positioning sensor is configured to operate according to an underwater acoustic positioning system.

In Example 62, the autonomous underwater vehicle of any one of Examples 59 to 61 is disclosed, wherein the underwater positioning sensor is configured to operate according to a Precision ocean Interrogation, Navigation, and timing (POINT) positioning system.

In Example 63, the autonomous underwater vehicle of any one of Examples 59 to 61 is disclosed, wherein the underwater positioning sensor is configured to operate according to a POSYDON positioning system.

In Example 64, the autonomous underwater vehicle of any one of Examples 53 to 63 is disclosed, wherein the reference point is a point at a water surface.

In Example 65, the autonomous underwater vehicle of any one of Examples 53 to 64 is disclosed, wherein determining from the sensor data the distance between the light source and the reference point includes determining a position of the light source based on the sensor data.

In Example 66, the autonomous underwater vehicle of any one of Examples 53 to 65 is disclosed, wherein determining from the sensor data the distance between the light source and the reference point includes determining a depth of the light source based on the sensor data and determining a distance between the light source and the reference point based on the determined depth.

In Example 67, the autonomous underwater vehicle of any one of Examples 53 to 66 is disclosed, wherein the determined distance represents a distance that the wavelength travels through a liquid.

In Example 68, the autonomous underwater vehicle of any one of Examples 53 to 67 is disclosed, wherein the one or more processors are a system on chip (SOC).

In Example 69, the autonomous underwater vehicle of any one of Examples 53 to 68 is disclosed, wherein the one or more processors include a light source controller.

In Example 70, the autonomous underwater vehicle of any one of Examples 53 to 69 is disclosed, wherein the one or more processors are configured to determine the loss factor via a look-up table.

In Example 71, the autonomous underwater vehicle of any one of Examples 53 to 70 is disclosed, further including a light sensor, configured to detect a light transmission and to output sensor data representing the detected light transmission, and wherein the one or more processors are further configured to determine the loss factor by comparing the output sensor data representing the detected light transmission to a reference value.

In Example 72, the autonomous underwater vehicle of any one of Examples 53 to 71 is disclosed, wherein the light transmission is a light transmission at a predetermined luminous intensity.

In Example 73, the autonomous underwater vehicle of any one of Examples 53 to 72 is disclosed, wherein the reference value is a value corresponding to a sensor data value corresponding to a light transmission at the predetermined luminous intensity from a predetermined distance.

In Example 74, the autonomous underwater vehicle of any one of Examples 53 to 73 is disclosed, wherein at least a segment of the distance between the light sensor and the light transmissions is under water.

In Example 75, the autonomous underwater vehicle of any one of Examples 53 to 74 is disclosed, further including a sensor, configured to obtain sensor information representing a magnitude of water impurity and to output sensor data representing the magnitude of water of impurity.

In Example 76, the autonomous underwater vehicle of Example 75 is disclosed, wherein the one or more processors are further configured to determine the loss factor of the wavelength based additionally on the sensor data representing the magnitude of water impurity.

In Example 77, the autonomous underwater vehicle of any one of Examples 53 to 76 is disclosed, wherein the one or more processors are configured to determine the compensated luminous intensity based on the wavelength and the distance.

In Example 78, the autonomous underwater vehicle of any one of Examples 53 to 77 is disclosed, wherein the one or more processors are configured to determine the compensated luminous intensity using a look-up table.

In Example 79, a method of luminous intensity compensation is disclosed including: receiving sensor data representing a position of a light source; determining from the sensor data a distance between the light source and a reference point; determining a loss factor of a wavelength based on the determined distance between the light source and the reference point; determining a compensated luminous intensity to yield a target luminous intensity of the wavelength after luminous intensity reduction due to the loss factor; and outputting control data to control the light source to emit the wavelength at the compensated luminous intensity relative to the reference point.

In Example 80, the method of luminous intensity compensation of Example 79 is disclosed, wherein a distance between the light source and the reference point includes an underwater segment.

In Example 81, the method of luminous intensity compensation of Example 79 is disclosed, wherein the determined distance is a distance that the wavelength travels through a liquid between the light source and the reference point.

In Example 82, the method of luminous intensity compensation of any one of Examples 79 to 81 is disclosed, further including producing light in a plurality of wavelengths.

In Example 83, the method of luminous intensity compensation of any one of Examples 79 to 82 is disclosed, further including producing light according to any of a plurality of luminous intensities.

In Example 84, the method of luminous intensity compensation of any one of Examples 79 to 83 is disclosed, wherein the light source includes an LED.

In Example 85, the method of luminous intensity compensation of any one of Examples 79 to 84 is disclosed, further including receiving the sensor data from an underwater positioning sensor.

In Example 86, the method of luminous intensity compensation of Example 85 is disclosed, wherein the underwater positioning sensor is configured to operate according to an underwater positioning system.

In Example 87, the method of luminous intensity compensation of Example 85 or 86 is disclosed, wherein the underwater positioning sensor is configured to operate according to an underwater acoustic positioning system.

In Example 88, the method of luminous intensity compensation of any one of Examples 85 to 87 is disclosed, wherein the underwater positioning sensor is configured to operate according to a Precision ocean Interrogation, Navigation, and timing (POINT) positioning system.

In Example 89, the method of luminous intensity compensation of any one of Examples 85 to 88 is disclosed, wherein the underwater positioning sensor is configured to operate according to a POSYDON positioning system.

In Example 90, the method of luminous intensity compensation of any one of Examples 79 to 89 is disclosed, wherein the reference point is a point at a water surface.

In Example 91, the method of luminous intensity compensation of any one of Examples 79 to 90 is disclosed, wherein determining from the sensor data the distance between the light source and the reference point includes determining a position of the light source based on the sensor data.

In Example 92, the method of luminous intensity compensation of any one of Examples 79 to 91 is disclosed, wherein determining from the sensor data the distance between the light source and the reference point includes determining a depth of the light source based on the sensor data and determining a distance between the light source and the reference point based on the determined depth.

In Example 93, the method of luminous intensity compensation of any one of Examples 79 to 92 is disclosed, wherein the determined distance represents a distance that the wavelength travels through a liquid.

In Example 94, the method of luminous intensity compensation of any one of Examples 79 to 93 is disclosed, further including determining the loss factor via a look-up table.

In Example 95, the method of luminous intensity compensation of any one of Examples 79 to 94 is disclosed, further including detecting a light transmission, outputting sensor data representing the detected light transmission, and determining the loss factor by comparing the output sensor data representing the detected light transmission to a reference value.

In Example 96, the method of luminous intensity compensation of any one of Examples 79 to 95 is disclosed, wherein the light transmission is a light transmission at a predetermined luminous intensity.

In Example 97, the method of luminous intensity compensation of any one of Examples 79 to 96 is disclosed, wherein the reference value is a value corresponding to a sensor data value corresponding to a light transmission at the predetermined luminous intensity from a predetermined distance.

In Example 98, the method of luminous intensity compensation of any one of Examples 79 to 97 is disclosed, wherein at least a segment of the distance between the light sensor and the light transmissions is under water.

In Example 99, the method of luminous intensity compensation of any one of Examples 79 to 98 is disclosed, further including obtaining sensor information representing a magnitude of water impurity and outputting sensor data representing the magnitude of water of impurity.

In Example 100, the method of luminous intensity compensation of Example 99 is disclosed, further including determining the loss factor of the wavelength based additionally on the sensor data representing the magnitude of water impurity.

In Example 101, the method of luminous intensity compensation of any one of Examples 79 to 100 is disclosed, further including determining the compensated luminous intensity based on the wavelength and the distance.

In Example 102, the method of luminous intensity compensation of any one of Examples 79 to 101 is disclosed, further including determining the compensated luminous intensity using a look-up table.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. A luminous intensity compensator, comprising:
   a light source;
   a sensor, configured to receive sensor information representing a position of the light source, and to output sensor data representing the position of the light source;
   one or more processors, configured to:
   determine from the sensor data a distance between the light source and a reference point;
   determine a loss factor of a wavelength based on the determined distance between the light source and the reference point;
   determine a compensated luminous intensity to yield a target luminous intensity of the wavelength after luminous intensity reduction due to the loss factor;
   output control data to control the light source to emit the wavelength at the compensated luminous intensity.

2. The luminous intensity compensator of claim 1, wherein a distance between the light source and the reference point comprises an underwater segment.

3. The luminous intensity compensator of claim 1, wherein the determined distance is a distance that the wavelength travels through a liquid between the light source and the reference point.

4. The luminous intensity compensator of claim 1, wherein the light source is configured to produce light in a plurality of wavelengths.

5. The luminous intensity compensator of claim 1, wherein the light source is configured to produce light according to any of a plurality of luminous intensities.

6. The luminous intensity compensator of claim 1, wherein the sensor is an underwater positioning sensor and is configured to operate according to an underwater acoustic positioning system.

7. The luminous intensity compensator of claim 1, wherein the reference point is a point at a water surface.

8. The luminous intensity compensator of claim 1, wherein determining from the sensor data the distance between the light source and the reference point comprises determining a depth of the light source based on the sensor data and determining a distance between the light source and the reference point based on the determined depth.

9. The luminous intensity compensator of claim 1, wherein the determined distance represents a distance that the wavelength travels through a liquid.

10. The luminous intensity compensator of claim 1, further comprising a light sensor, configured to detect a light transmission and to output sensor data representing the detected light transmission, and wherein the one or more processors are further configured to determine the loss factor by comparing the output sensor data representing the detected light transmission to a reference value.

11. The luminous intensity compensator of claim 10, wherein the reference value is a value corresponding to a sensor data value corresponding to a light transmission at the predetermined luminous intensity from a predetermined distance.

12. The luminous intensity compensator of claim 1, further comprising a sensor, configured to obtain sensor information representing a magnitude of water impurity and to output sensor data representing the magnitude of water of impurity.

13. The luminous intensity compensator of claim 1, wherein the one or more processors are further configured to determine a loss factor of the wavelength based additionally on the sensor data representing a magnitude of water impurity.

14. A method of luminous intensity compensation comprising:
   receiving sensor data representing a position of a light source;
   determining from the sensor data a distance between the light source and a reference point;
   determining a loss factor of a wavelength based on the determined distance between the light source and the reference point;
   determining a compensated luminous intensity to yield a target luminous intensity of the wavelength after luminous intensity reduction due to the loss factor; and
   outputting control data to control the light source to emit the wavelength at the compensated luminous intensity.

15. The method of luminous intensity compensation of claim 14, wherein a distance between the light source and the reference point comprises an underwater segment.

16. The method of luminous intensity compensation of claim 14, wherein the determined distance is a distance that the wavelength travels through a liquid between the light source and the reference point.

17. The method of luminous intensity compensation of claim 14, further comprising receiving the sensor data from an underwater positioning sensor.

18. The method of luminous intensity compensation of claim 14, further comprising detecting a light transmission, outputting sensor data representing the detected light transmission, and determining the loss factor by comparing the output sensor data representing the detected light transmission to a reference value.

19. The method of luminous intensity compensation of claim 14, wherein the reference value is a value corresponding to a sensor data value corresponding to a light transmission at the predetermined luminous intensity from a predetermined distance.

20. The method of luminous intensity compensation of claim 14, further comprising determining the compensated luminous intensity based on the wavelength and the distance.

* * * * *